(12) United States Patent
Rubel et al.

(10) Patent No.: US 9,836,314 B2
(45) Date of Patent: Dec. 5, 2017

(54) NATIVE USER INTERFACE INTERACTION VIA A WEB-BASED USER INTERFACE

(75) Inventors: Ralf Rubel, Gaggenau (DE); Henning Duerholt, Heidelberg (DE)

(73) Assignee: SAP SE, Walldorf (DE)

( * ) Notice: Subject to any disclaimer, the term of this patent is extended or adjusted under 35 U.S.C. 154(b) by 411 days.

(21) Appl. No.: 13/616,797

(22) Filed: Sep. 14, 2012

(65) Prior Publication Data

US 2014/0082502 A1 Mar. 20, 2014

(51) Int. Cl.
G06F 3/048 (2013.01)
G06F 9/44 (2006.01)
G06F 3/0346 (2013.01)

(52) U.S. Cl.
CPC .......... G06F 9/4445 (2013.01); G06F 3/0346 (2013.01)

(58) Field of Classification Search
CPC .............................. G06F 8/38; G06F 17/30861
See application file for complete search history.

(56) References Cited

U.S. PATENT DOCUMENTS

| | | | | |
|---|---|---|---|---|
| 5,892,905 | A * | 4/1999 | Brandt | H04L 63/02 709/202 |
| 6,115,040 | A * | 9/2000 | Bladow | G06F 11/0709 707/E17.107 |
| 6,125,384 | A * | 9/2000 | Brandt | G06F 17/3089 707/E17.116 |
| 2004/0028212 | A1* | 2/2004 | Lok | G06F 17/30873 379/265.09 |
| 2004/0123302 | A1* | 6/2004 | Lo | G06Q 10/06 719/310 |
| 2007/0150822 | A1* | 6/2007 | Mansour | G06F 9/4445 715/762 |
| 2009/0048880 | A1* | 2/2009 | Shoshan | G06Q 10/00 705/7.12 |
| 2010/0125600 | A1* | 5/2010 | Said | G06F 17/30463 707/778 |
| 2010/0191554 | A1* | 7/2010 | Singh | G06Q 10/063 705/7.11 |
| 2012/0159308 | A1* | 6/2012 | Tseng | G06F 9/4443 715/234 |
| 2012/0173658 | A1* | 7/2012 | Tussing | H04L 67/2819 709/217 |
| 2013/0110667 | A1* | 5/2013 | DeBusk | G06Q 30/06 705/26.5 |
| 2014/0047517 | A1* | 2/2014 | Ding | H04L 12/1453 726/5 |

OTHER PUBLICATIONS

Aral Balkan, Mobile Considerations in User Experience Design: "Web or Native?" Jun. 18, 2012, Smashing Magazine, pp. 1-45.*

* cited by examiner

*Primary Examiner* — Jeffrey A Gaffin
*Assistant Examiner* — Justin Lee
(74) *Attorney, Agent, or Firm* — Schwegman Lundberg & Woessner, P.A.

(57) ABSTRACT

Example systems and methods of Interaction with a native user interface via a web-based user interface are presented. In one example, a web-based transaction identifying a function to be executed in a processing system is launched in a web-based user interface session. A web application is invoked in the web-based transaction. A native user interface session is initiated from the web application. A native adapter transaction based on the web-based transaction is launched in the native user interface session. Execution of the function in the processing system is initiated in the native adapter transaction.

18 Claims, 10 Drawing Sheets

CRM WEB-BASED USER INTERFACE 700

Sales Order ID: [706]

Identify Account (ID: 3270)

| Field | Value |
|---|---|
| First Name/Last Name | Chris / Johnson |
| Account | Newco, Inc. |
| Street/House Number | Anywhere Ave. / 1234 |
| City | Platteville |
| Postal Code/Region | 09876 / OH |
| Country | USA |
| Phone | (012) 555-1234 |
| Fax | (012) 555-5678 |
| E-mail | Chris.Johnson@newco.com |

702

[Launch ERP GUI] — 704

FIG. 7

NATIVE USER INTERFACE 800

Create Sales Order: Overview (Sales Order ID: 7843562) ← 806

804 → Ship to  [3270]  Newco, Inc., 1234 Anywhere Ave., Platteville, OH 09876

Sold to  [3270]  Newco, Inc., 1234 Anywhere Ave., Platteville, OH 09876

Req. Delivery Date  [4/1/12]

Payment Card Type  [PayCard]

Payment Card No./Verification No.  [WWWW-XXXX-YYYY-ZZZZ]  [XXX]

Exp. Date  [11/2014]

Total Order Weight  [5.00]  [kg]

Net Charge  [950.00]  [USD]

Item Purchased/Quantity  [628543]  [1]

NATIVE USER INTERFACE INTERACTION VIA A WEB-BASED USER INTERFACE

BACKGROUND

Network server-based computing systems, such as, for example, enterprise resource planning (ERP) and customer relationship management (CRM) systems, have long been employed to provide various services within a business or commercial enterprise to numerous client devices simultaneously or concurrently over a network, such as a wide-area network (WAN) (e.g. the Internet) or a local-area network (LAN), in many cases, a native user interface is executed on each client system to facilitate access to a server system via the network, oftentimes via an Application Programming Interface (API) provided on the server system being accessed. Generally, a different version of the native user interface is provided for each different operating system that may be employed by the client devices, in most cases, use native user interface provides each of the client devices substantially complete access to all pertinent functions or services.

More recently, these server-based systems provide web-based user interfaces through which the client systems may access the various services provided by the server via a web browser executing on the client device. As web browsers, such as Internet Explorer® by Microsoft® Corporation and Mozilla Firefox®, are widely available and utilize a similar set of protocols for the transmission and reception of information via a network, a native user interface need not be developed, deployed, upgraded, and so on to allow client devices access to at least some of the services provided by the server systems. Depending on the particular server systems and associated services involved, however, use of a web-based user interface may limit or prohibit access to one or more services provided by the server systems compared to the use of a native user interface designed and developed specifically for the services provided.

BRIEF DESCRIPTION OF DRAWINGS

The present disclosure is illustrated by way of example and not limitation in the figures of the accompanying drawings, in which like references indicate similar elements and in which:

FIG. 7 is a graphical representation of an example CRM web-based user interface related to the example method of FIGS. 6A and 6B;

FIG. 8 is a graphical representation of an example ERP native user interface related to the example method of FIGS. 6A and 6B.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
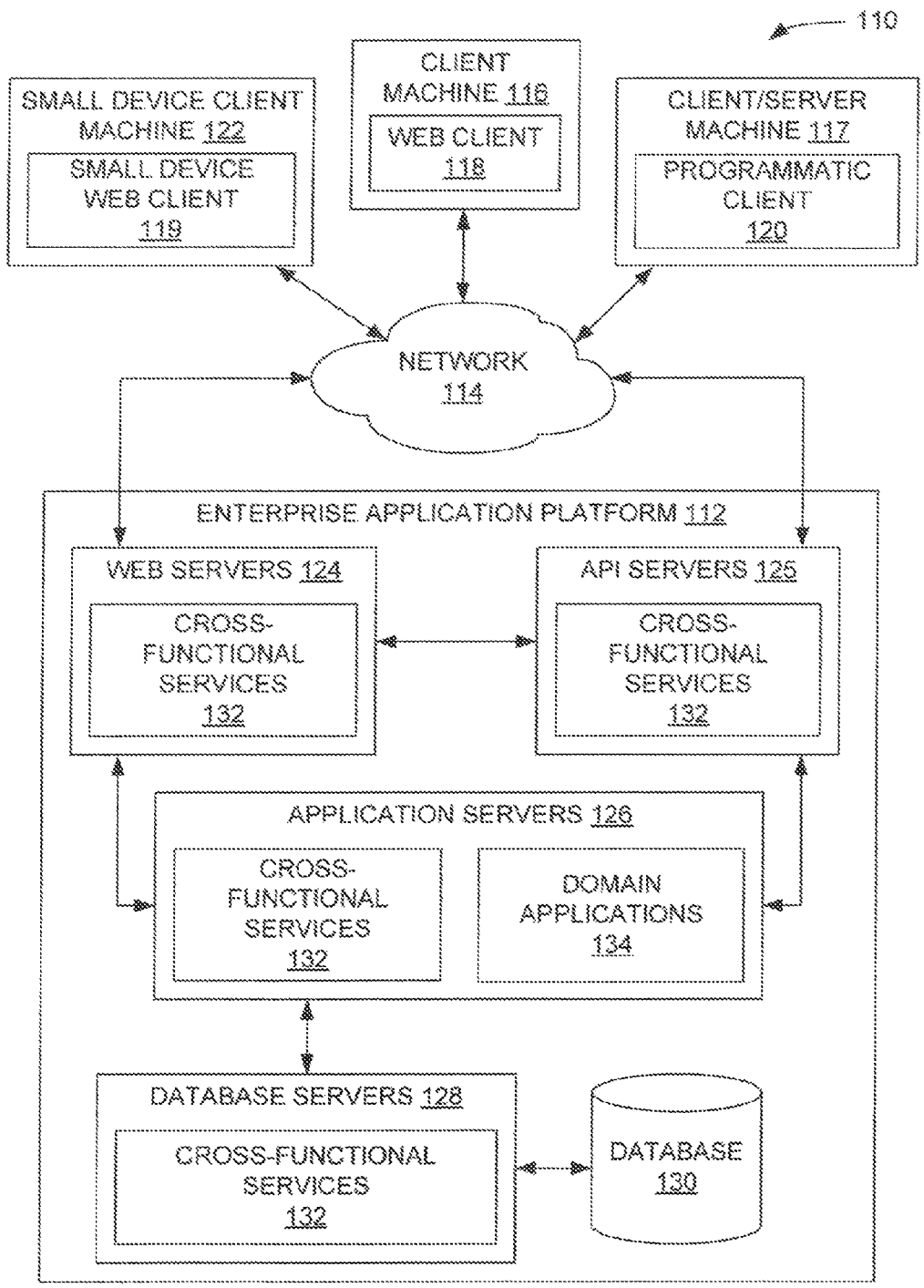
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, far example, a client machine 116 with a web client 118 (e.g., a browser, such as the Internet Explorer® browser developed by Microsoft® Corporation), a small device client machine 122 with a small device web client 119 (e.g., a browser without a script engine), and a client/server machine 117 with a programmatic client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128 that may facilitate access to one or more databases 130. The web servers 124, application program interface servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client, machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
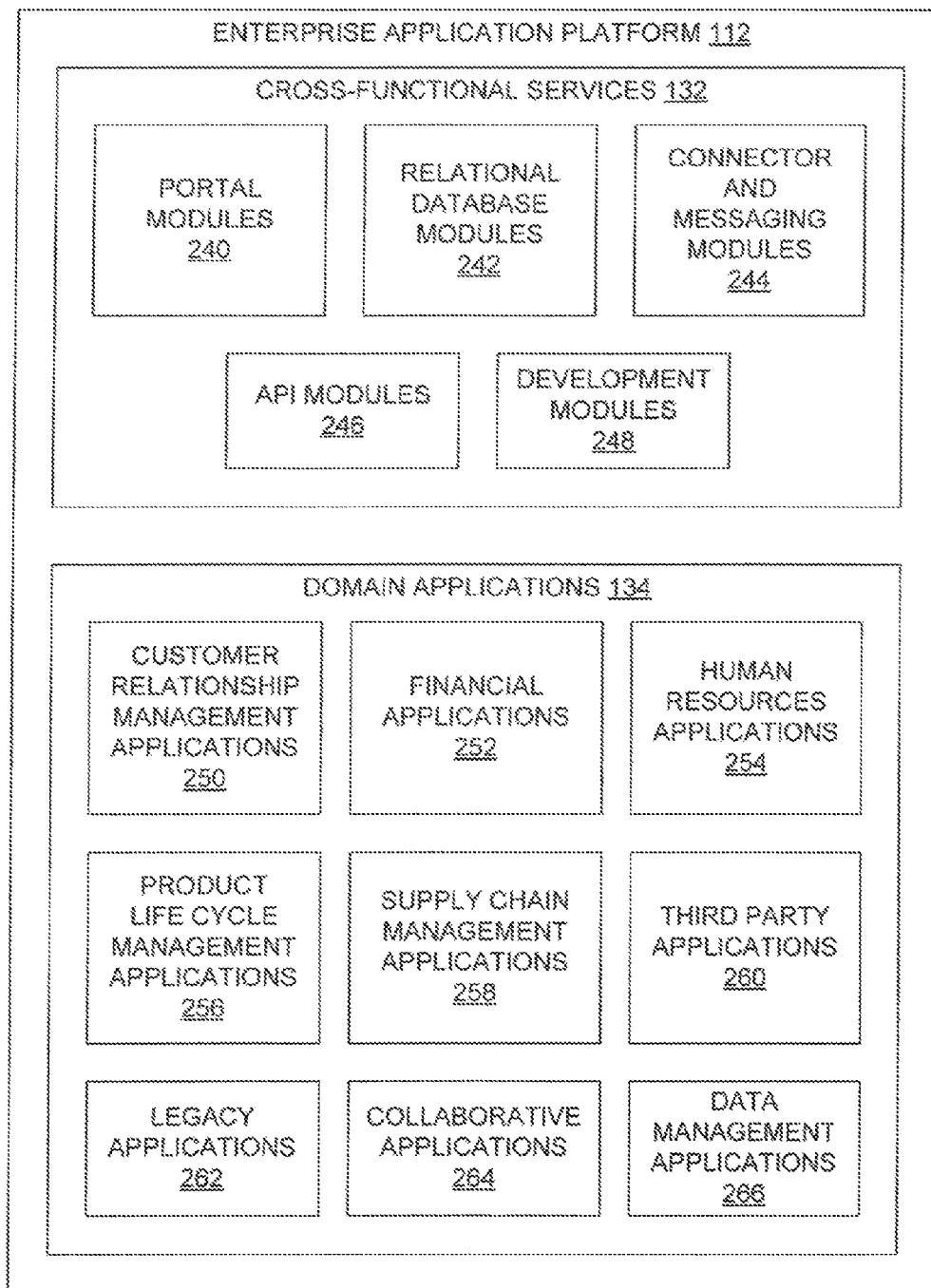
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, application program interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java®, J2EE, SAP's Advanced Business Application Programming (ABAP®) Language and Web Dynpro, XML, JCA, JAAS, X.509, LDAP, WSDL, WSER, SOAP, UDDL and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The application program interface (API) modules 246 may enable the development of service-based applications by exposing an interface to existing and new applications as services. Repositories may be included in the platform 112 as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysts of human resource issues and facilitate human resource decisions based on real-time information.

Product life cycle management applications 256 may enable the management of a product throughout the life cycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work, product by multiple users, and data management applications 266 may enable data organization and other management functions to be performed on data generated by one or more other domain applications 134.

Figure 3:
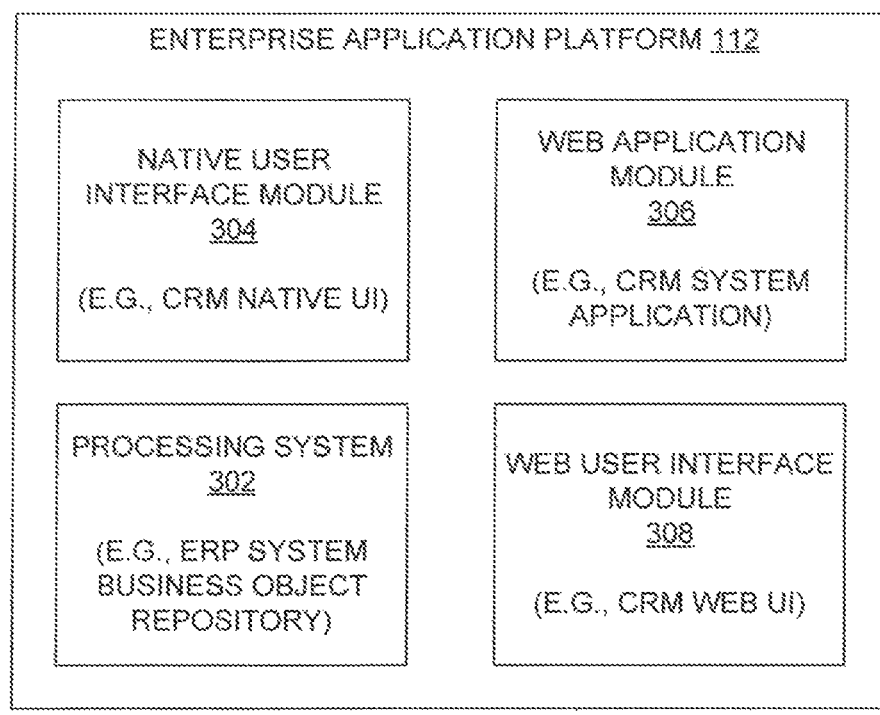
FIG. 3 is a block diagram of an example system for facilitating access to a native user interface via a web-based user interface.

FIG. 3 is a block diagram of an example of the enterprise application platform 112 of FIG. 1 for facilitating access to a native user interface via a web-based user interface. In the example of FIG. 3, the enterprise application platform 112 may include a processing system 302 (such as, for example, a business object repository of an ERP system), a native user interface module 304 (such as, for example, a module that provides a CRM system native user interface), a web application module 306 (such as a CRM system application), and a web user interface module 308 (such as, for example, a CRM web-based user interface).

One or more of the modules 302-308 of FIG. 3 may be represented in the modules of the enterprise application platform 112 depleted in FIG. 2. For example, the processing system 302 may be one or more of the relational database modules 242 or domain applications 134. The native user interface module 304 may represent one or more of the API modules 246. The web application module 306 may be any one or more of the domain applications 134. Finally, the web user interface module 308 may represent one or more of the portal modules 240. In other examples, one or more of the modules 302-308 of FIG. 3 may be located external to the enterprise application platform 112.

The processing system 302 may be any processing system for which a native user interface and/or a web-based user interface may be provided for accessing one or more services of interest to a user. In one example, the processing system 302 is a Business Object Repository (BOR) of an ERP system, such as an ERP system provided by SAP AG of Walldorf, Germany. Business objects held in such a repository may include objects representing sales orders, customer service orders, item inventory, supply chain management information, employee records, design and development information, and so on.

The native user interface module 304 may provide an API or other interface through which a native user interface application executing on a client machine 116, 117, 122 may access one or more of the services provided on the enterprise application platform 112, as described above. In one implementation, the native user interface module 304 may facilitate generation and updating one or more business objects or records, such as sales records, repair records, and other objects associated with a BOR.

The web application module 306 may include a web application that is accessible via the web user interface module 308. In one example, the web application module 306 may include a Business Server Pages (BSP) application residing, within an CRM system, such as a CRM system provided by SAP of Walldorf Germany, that is accessible via a web browser executing on a client device 116, 117, 122 via the web user interface module 306.

The web user interface module 308 may provide access to one or more web applications provided in the web application module 306 in the enterprise application platform 112 via a web browser executing on a client device 116, 117, 122. In one example, the web user interface module 308 operates as a CRM system web-based user interface, thus providing access to one or more CRM-related applications operating in the enterprise application platform. In some implementations, the web user interface module 308 may be compatible with multiple web browsers executing on different client device platforms.

Some of the embodiments described herein, distinguish between an ERP system and a CRM system. Historically, an ERP system facilitates the management of employees, productivity, and various other functions internal to an enterprise or organization, while a CRM system is focused primarily on managing customers, sales, and other aspects of an organization that are visible outside the organization. However, an ERP system, such as the enterprise application platform 112 described above, may also provide functionality applicable to a CRM system. Thus, various embodiments described herein may incorporate an ERP system and a CRM system into the same physical system, in separate physical systems, or some combination thereof.

Figure 4:
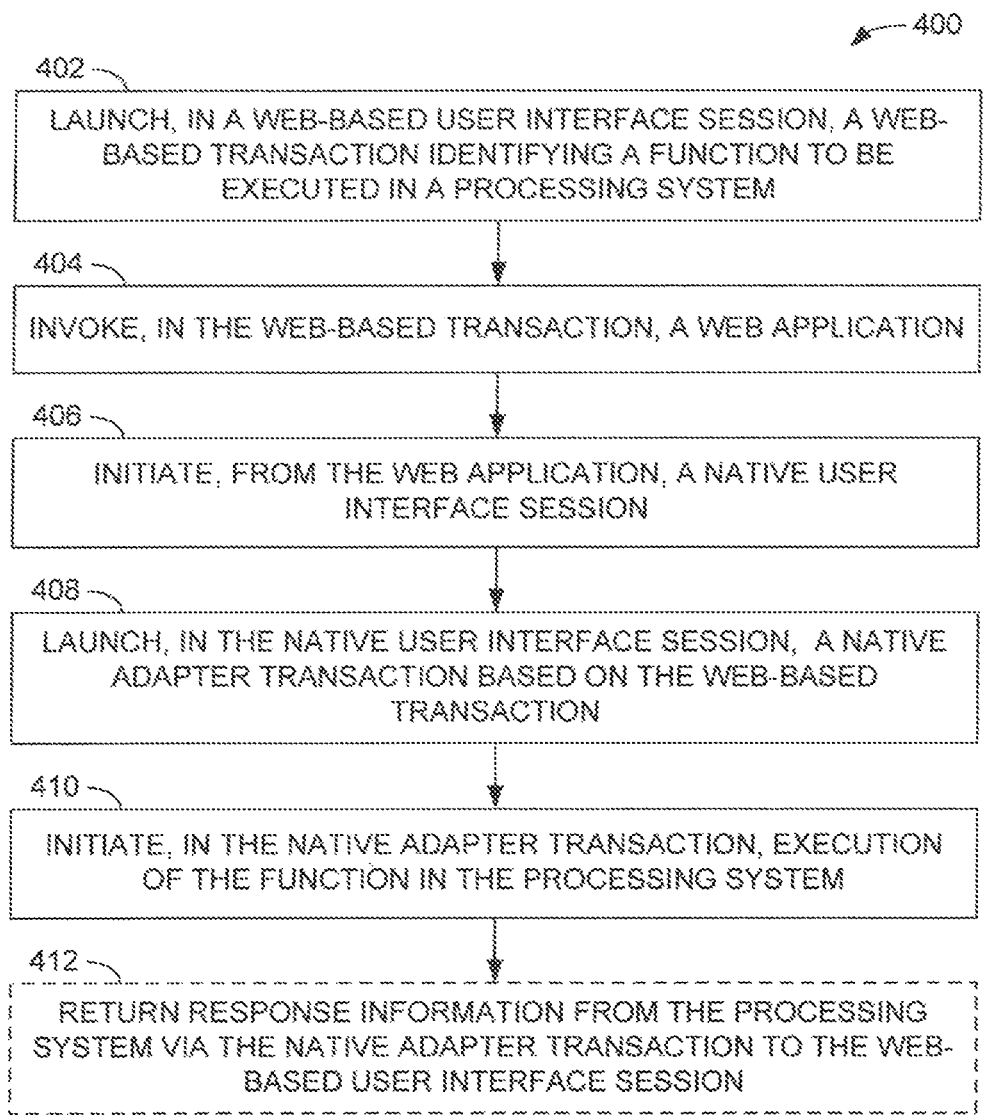
FIG. 4 is a flow diagram illustrating an example method of facilitating access to a native user interface via a web-based user interface.

FIG. 4 is a flow diagram illustrating an example method 400 of facilitating access to a native user interface via a web-based user interface. In the method 400, a web-based transaction identifying a function to be executed in a processing system (e.g., the processing system 302 of FIG. 3) is launched in a web-based user interface session (e.g., via the web user interface module 308 of FIG. 3) (operation 402). In one example, the web-based transaction is launched in response to an explicit user command entered by a user during the web-based user interface session, in other implementations, the launching of the web-based transaction may be an implicit, reaction to one or more actions of the user during the web-based user interface session, or in response to another event.

Further according to the method 400, a web application (e.g., from the web application module 306 of FIG. 3) is invoked in the web-based transaction (operation 404). A native user interface session (e.g., via the native interface module 304 of FIG. 3) is initiated from the web application, (operation 406). A native adapter transaction based on the web-based transaction may then be launched in the native user interface session (operation 408). Execution of the function in the processing system may then be initiated in the native adapter transaction (operation 410). Optionally, response information from the processing system (e.g., information returned as a result of the execution of the function) may be returned via me native adapter transaction to the web-based user interface session (operation 412).

While the operations 402 through 412 of the method 400 of FIG. 4 are shown in a specific order, other orders of operation, including possibly concurrent or continual execution of at least portions of one or more operations, may be possible in some implementations of method 400, as well as other methods discussed herein.

As a result of at least some of the embodiments described above, functions or methods that may not be directly initiated via the web-based user interface may be executed by use of a native user interface that is initiated in response to user interaction, with the web-based user interface. Other possible aspects and advantages may be ascertained from the discussion of the various embodiments presented below.

Figure 5:
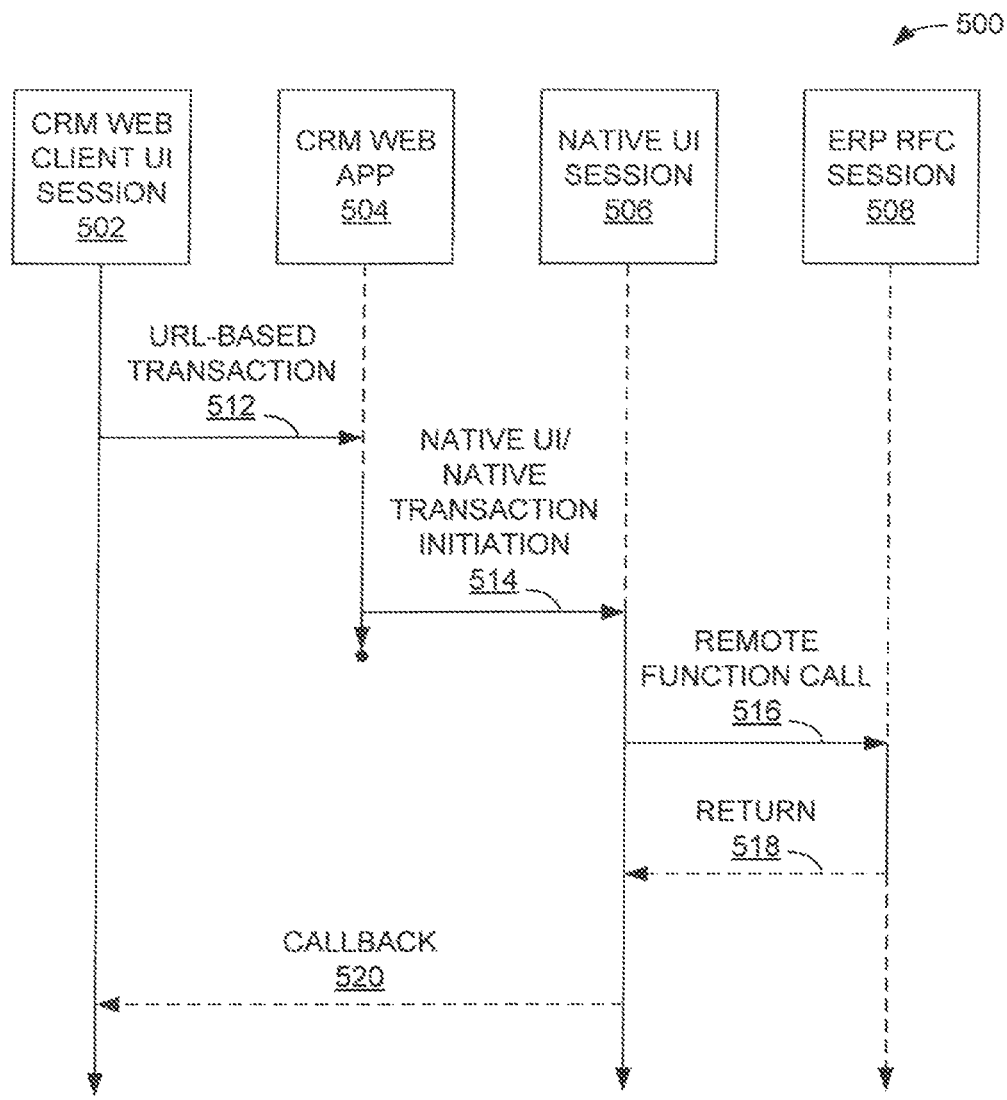
FIG. 5 is a communication diagram exhibiting example interactions between multiple sessions or applications to facilitate access to a native user interface via a web-based user interface.

FIG. 5 is a communication diagram exhibiting example interactions 500 between multiple sessions or applications to facilitate access to a native user interface via a web-based user interface, similar to the method 400 of FIG. 4. In this example, the interactions 500 of FIG. 5 more specifically involve a CRM web client user interface and an ERP native user interface. However, other implementations may involve just a single CRM system, a single ERP system, or any other one or more computing systems that provide a web-based user interface and/or a native user interface.

As illustrated in FIG. 5, a CRM web client user interface session 502 may launch a URL (Uniform Resource Locator) based transaction 512. In at least some embodiments, a transaction is an execution of a program or application, which, in this example, invokes a CRM web application 504. In some implementations, the CRM web application 504 may retrieve or receive data from the context of the CRM web client session 502. The CRM web application 504 may then employ the retrieved data for a native user interface and native transaction initiation 514. More specifically, in one example, the CRM web application may initiate a native user interface session 506, and launch a native transaction in the native user interface session 506. In some examples, the initiation of the native user interface session 506 and the launching of the native transaction may occur simultaneously, or may be performed using separate actions by the CRM web application 504. In some implementations, the native transaction may be termed an "adapter transaction," or a "native adapter transaction," as the transaction involves a different user interface (e.g., the native user interface for the ERP system) than the original transaction (e.g., the web-based user interface for the CRM system). In addition, the native adapter transaction may execute in the native user interface session but may not engage in any actual user interaction; instead, the native adapter transaction employs the native user interface to access a function within the ERP system.

In response to the native adapter transaction, a remote function call (RFC) 516 may be issued to invoke a function of an ERP system during an ERP RFC session 508. In one implementation, the function may be a method associated with a particular object stored in a Business Object Repository (BOR), as mentioned above, in response to the execution of the function, a return 518, such as a status or value returned from the function, may be returned from the ERP RFC session 508 to the native adapter transaction executing in the native user interface 506. Thereafter, the response data, or some portion thereof, may be returned from the native user interface session 506 by way of a callback 520, such as an HTML callback message, to the web client user interface session 502. As a result of the communications between the various sessions and application identified in FIG. 5, the full functionality of a native user interface may be employed via a web-based user interface. Further, in some examples, a user may access the native user interface directly, in tandem with the web-based user interface, to enhance the ability of the user to update and otherwise access the ERP system.

Figure 6A:
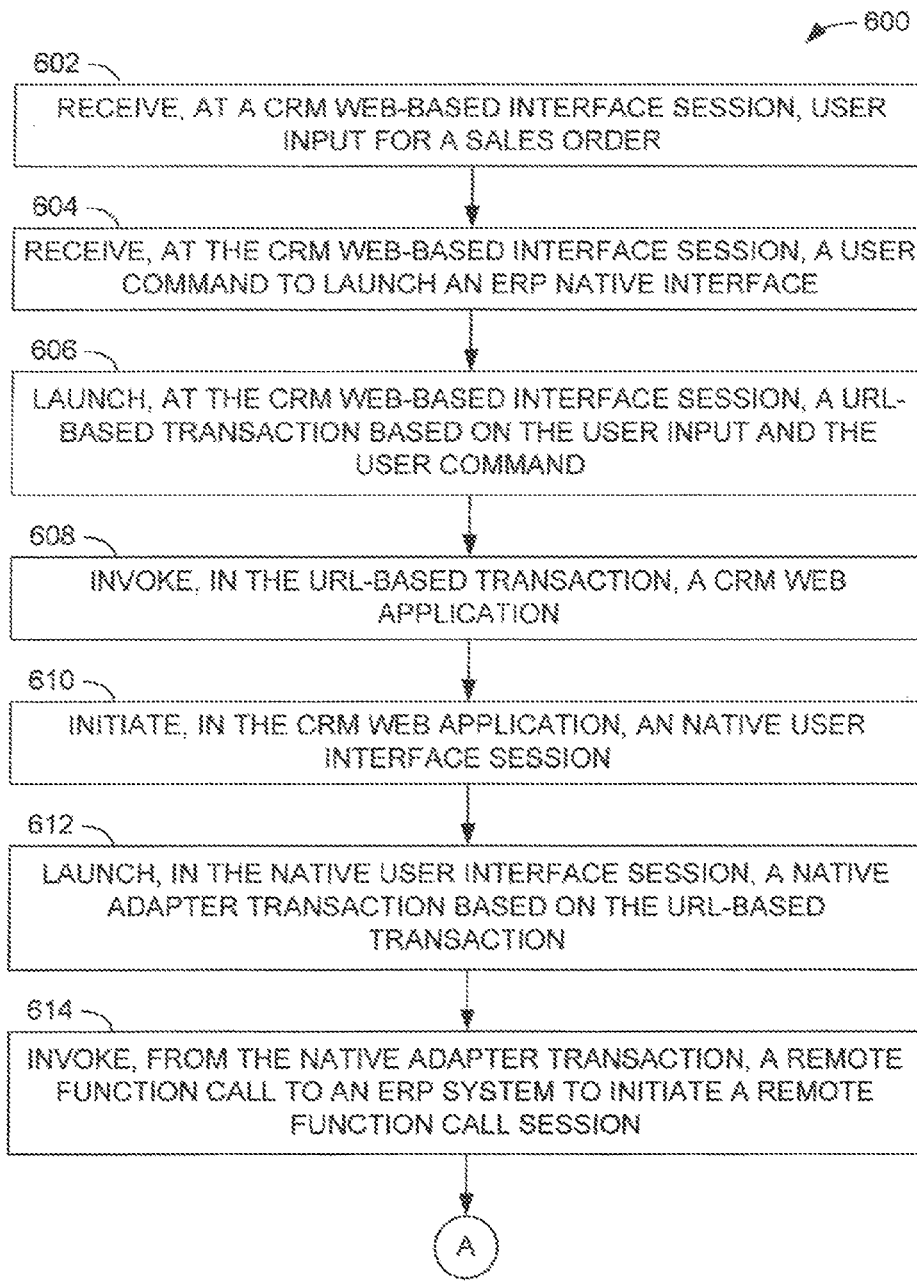
FIGS. 6A and 6B provide a flow diagram of an example method of facilitating access to a native user interface for an ERP system via a web-based user interface for a CRM system.
Figure 6B:
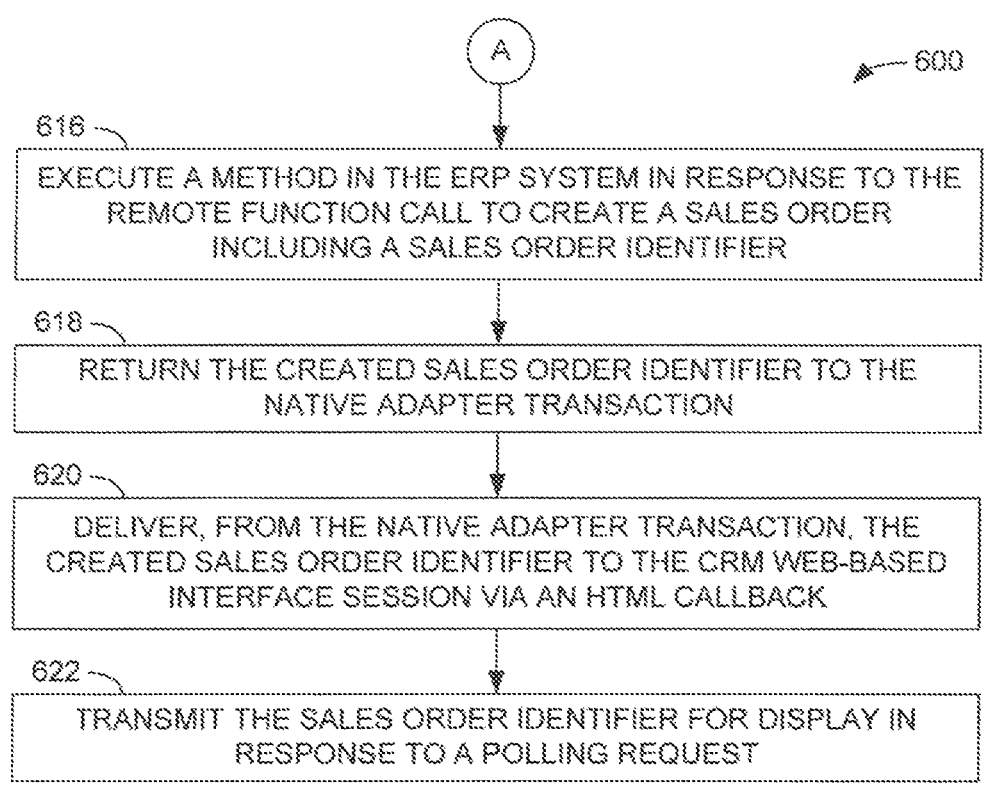

FIGS. 6A and 6B provide a flow diagram of an example method 600 of facilitating access to a native user interface for an ERP system via a web-based user interface for a CRM system. In this particular example, an employee-user of an organization desires to create a sales order for one or mote items to be purchased by a customer of the organization. For example, the user may be taking information regarding the proposed purchase from the customer over the phone. As a result, the user may be interacting with a CRM web-based interface to begin creating the sales order.

Thus, in me method 600, user input for a sales order is received at a CRM web-based interface session (operation 602). An example of a CRM web-based user interface 700 is depicted in FIG. 7. The web-based user interface 700 may include account identification fields 702 for entering customer information, such as name, company (account) name, address, and other contact information for the customer, in one example, the user may fill the customer identification fields 702 based on information provided by the customer. In another example, at least one of the customer identification fields 702 may be auto-populated based on partial information entered by the user, such as an account name or account identifier (e.g., Account ID 3270, as shown in FIG. 7). However, during this interaction with the CRM web-based user interface 700, an actual sales order, as identified via a sales order identifier 700, is not generated. In this example, the creation of the actual sales order may be carried out more completely via a native user interface for an ERP system that stores sales order objects. In one example, the user may activate a launch button 704 (labeled "Launch ERP GUI") of the CRM web-based user interface 700 to initiate the method 600 of FIGS. 6A and 6B to launch the native user interface.

As a result, returning to FIG. 6A, a user command to launch the native user interface, such as indicated via activation of the launch button 704, is received at the CRM web-based user interface session (operation 604). Based on the user command and the user input (e.g., information from the account identification fields 702 of the CRM web-based user interface 700), a URL-based transaction is launched at the CRM web-based user interface session (operation 606). In an example, the URL-based transaction is launched via a web link associated with the launch button 704. The URL-based transaction, in turn, may invoke a CRM web application (operation 608).

In one example, the CRM web application receives or retrieves the account information, possibly along with other pertinent data, in a particular implementation, the CRM web-based user interface session may provide the account information directly to the CRM web application, or via the URL-based transaction. In another implementation, the CRM web application retrieves the account information from a data context or environment associated with the CRM web-based user interface session.

In one embodiment the CRM web application may employ a concept, called a "shortcut," which may facilitate the launching of a transaction originating in one system (e.g., a CRM system) for execution in the same or another system (e.g., an ERP system). Such a shortcut, system has been developed by SAP AG of Walldorf, Germany. As described above, that transaction to be launched may be termed a native interface transaction or, more generally, an adapter transaction or native adapter transaction. More specifically, the CRM web application may generate a shortcut file that includes a number of parameters based on the user input received via the CRM web-based user interface session that are to be transferred to, or otherwise employed in, a native user interface session. The shortcut file may include, for example, the system to which use transaction is to be directed (e.g., an ERP system), an identifier for the customer account, a user or contact name, a type of object involved in the transaction (e.g., a sales order object), and a type of method or function to be executed involving the object (e.g., a sales order creation method). Such information may be determined from the user input, the user command, and/or the CRM web-based user interface session itself. Additionally, the CRM web application may also include an identification of the CRM web-based user interface session (e.g., a session identifier) in the shortcut file so that any response information generated during the native user interface session may be returned to the CRM web-based user interface session. In another example, other data structures or methods of providing this information for an adapter transaction to be executed via the native user interface may be utilized.

The CRM web application, based on the above information, may also generate a shortcut link to be provided along with the parameters to facilitate launching of the native interface transaction via a transaction service or system within the CRM system. Using the shortcut file and link, the CRM web application may then initiate a native user interface session (operation 610) and launch a native adapter transaction in the native user interface session (operation 612). In some examples, the CRM web application triggers the execution of the shortcut link, which then causes both the initiation of the native user interface session and the launching of the native adapter transaction within the native user interface session.

In the native adapter transaction, a remote function call to a method indicated in the shortcut file is invoked (operation 614). This invocation may thus initiate a remote function call session in the ERP system so that the indicated method may be executed. In this particular example, the method creates a sales order object to be associated with the customer account indicated doting the CRM web-based user interface session. In an example noted above, the method is a method provided in a Business Object Repository (BOR) of the ERP system. In response to the remote function call the ERP system may execute the method to create the sales order object associated with the account (operation 616 of FIG. 6B).

FIG. 8 is a graphical representation of an example native user interface 800 directed to creating a sales order object. In one example, the native user interface 800 is displayed to the user that is interacting with the CRM web-based user interface 700 (FIG. 7). As a result, the user may have access to both user interfaces 700, 800 simultaneously or concurrently, and thus may continue to enter or view data via either user interface 700, 800. In one implementation, the native user interface 800 may be presented in a separate window of a display atop the CRM web-based user interface 700. From the perspective of the user, the native user interface 800 may be presented on the display in response to the user activating the launch button 704 (FIG. 7).

As shown in FIG. 8, at least some of the information provided or indicated in the CRM web-based user interface 700 may be transferred over to the native user interface 800. For example, based on the identification of the account (e.g., account ID 3270), information about that account, such as the company or account name, address, and other related information, may be displayed in the native user interface 800, such as at the shipping and purchase information 804 presented therein.

The user may also employ the native user interface 800 to enter information specific to the particular sales order that has been created, in some examples, the CRM web-based user interface 700 may not provide entry fields or other structures by which such information may be entered. In the example of FIG. 8, this information may include sales information 802 specific to the particular sales order, such as a requested delivery date, information regarding a credit card being used for payment, the total cost of the sales order, the particular stems being purchased, and so on.

Returning to FIG. 6B, in response to the creation of the sales order (operation 616), the ERP system may generate a sales order identifier 806 associated with that sales order. In one example, the sales order identifier 806 may be returned to, and displayed in, the native user interface 800 via the native adapter transaction (operation 618) (e.g., Sales Order ID 7843562 in FIG. 8), such as via a return value provided by the invoked method. Further, the same order identifier 806, possibly along with other information of interest, may be delivered from the native user interface session via the native adapter transaction to the CRM web-based user interface session. In one implementation, the CRM web-based user interface session identifier discussed above may be used redirect the sales order identifier 806 and/or other information related to the sales order to the correct CRM web-based user interface session, as more than one such session may be active at a time in the CRM system.

More specifically, the native user interface session, via the native adapter transaction, may return the sales order identifier 806 via an HTML callback (operation 620) using the CRM web-based user interface session identifier. In one example, the HTML callback is performed using a messaging protocol employed within the CRM system, such as the Simple ABAP® Messaging (SAM) system developed by SAP AG of Walldorf, Germany. Additionally, to display the sales order identifier 806 and/or other pertinent information, the CRM web-based user interface session may provide the information in response to a polling request mom the client system 116, 117, 122 displaying the CRM web-based user interface (operation 622). In an example, the CRM system may provide an Interaction Center (IC), also developed by SAP AG, which the CRM web-based user interface client executing on the client system 116, 117, 122 may poll periodically to retrieve alerts, broadcast messages, and other event notifications supplied by the CRM system. Using this mechanism, the CRM web-based user interface client may provide the returned sales order identifier 806. In one implementation, the sales order identifier 806 is provided in a sales order identifier field 706 presented in the CRM web-based user interface 700 (FIG. 7).

While many of the embodiments described herein involve CRM and ERP systems and, more specifically, creation of sales orders within such systems, the techniques and concepts discussed herein are applicable to other networked computing systems that provide either or both of a web-based user interface and a native user interface, and that provide access to a computer-based service.

In view of the inventive concepts disclosed herein, a user may employ a web-based user interface for a networked computing system to initiate and access a native user interface for a computer-related function, thus allowing the user to access different, but potentially related, information regarding that function via the two user interfaces. Thus, access to the native user interface may be considered to be integrated into the web-based user interface. Further, the user may access both user interfaces simultaneously or concurrently via the same client device machine, and information from one interface may be used to populate at test a portion of the data entered via the other interface, thus facilitating a more efficient interaction between the user and the networked computer systems.

Figure 9:
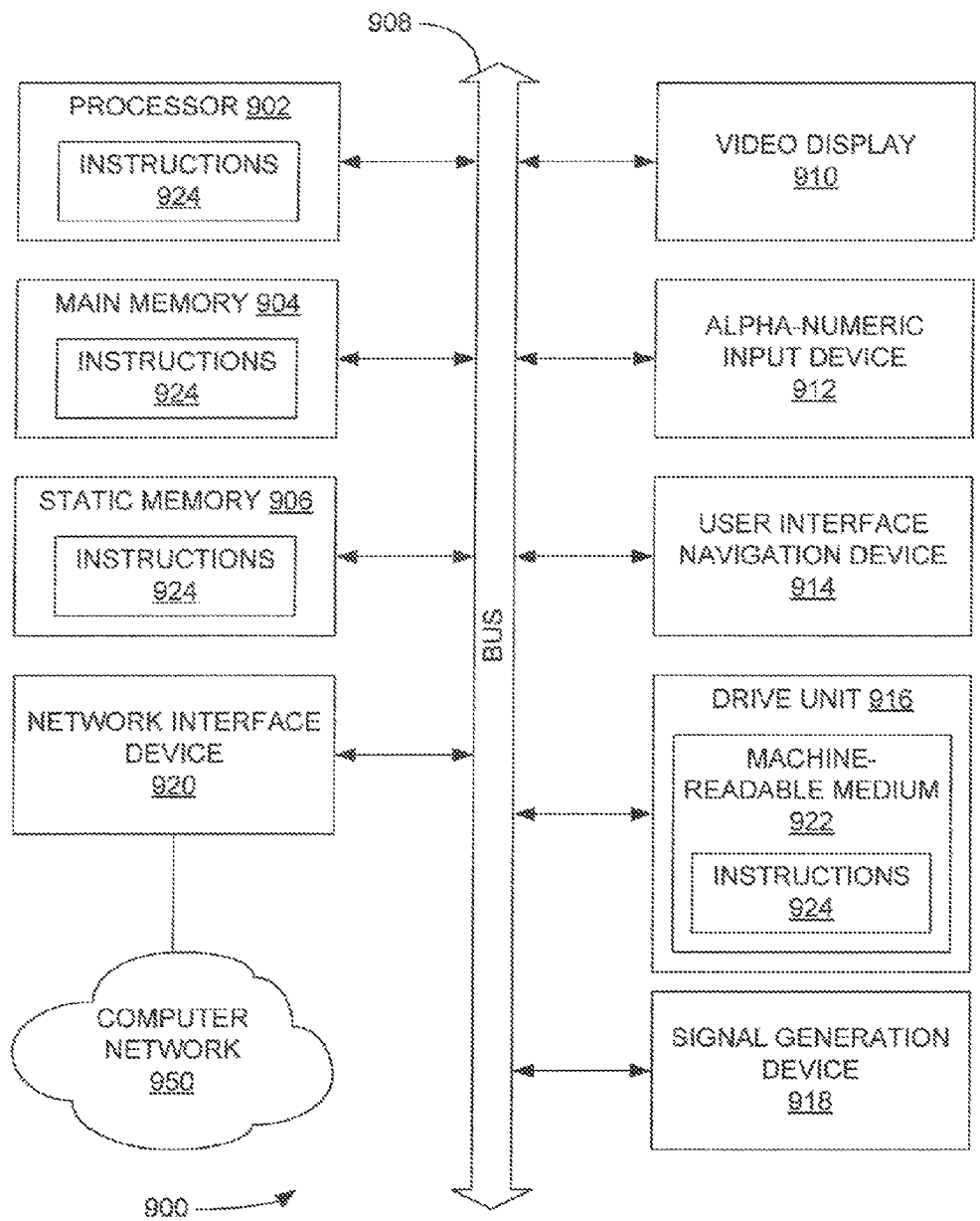
FIG. 9 is a block diagram of a machine in the example form of a processing system within which may be executed a set of instructions for causing the machine to perform any one or more of the methodologies discussed herein.

FIG. 9 depicts a block diagram of a machine in the example form of a processing system 900 within which may be executed a set of instructions 924 for causing the machine to perform any one or more of the methodologies discussed herein. In alternative embodiments, the machine operates as a standalone device or may be connected (e.g., networked) to other machines, in a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 900 includes a processor 902 (e.g., a central processing unit (CPU), a graphics processing unit (GPU), or both), a main memory 904 (e.g., random access memory), and static memory 906 (e.g., static random-access memory), which communicate with each other via bus 908. The processing system 900 may further include video display unit 910 (e.g., a plasma display, a liquid crystal display (LCD), or a cathode ray tube (CRT)). The processing system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904, the static memory 906, and/or within the processor 902 during execution thereof fey processing system 900, with the main memory 904 and processor 902 also constituting machine-readable, tangible media.

The data structures and instructions 924 may further be transmitted or received over a computer network 950 via network interlace device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium- or in a transmission signal) or hardware modules. A hardware module is a tangible unit capable of performing certain operations and may be configured or arranged in a certain manner. In example embodiments, one or more computer systems (e.g., the processing system 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 902 that is configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine but deployed across a number of machines. In some example embodiments, the processors 902 may be located in a single location (e.g., within a home environment, within an office environment, or as a server farm), while in other embodiments, the processors 902 may be distributed across a number of locations.

While the embodiments are described with reference to various implementations and exploitations, it will be understood that these embodiments are illustrative and that the scope of claims provided below is not limited to the embodiments described herein, in general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
    causing, at a client machine of a first system, a web browser-based user interface of the first system to be displayed;
    launching at the client machine of the first system, in the web browser-based user interface of the first system, a web-based sales order creation transaction identifying a sales order creation function stored within a second system;
    invoking, in the web-based transaction, a web application executing on one or more processors of the client machine;
    receiving, via the web browser-based user interface, user input for a web-based sales order;
    receiving, via the web browser-based user interface, a user input command to launch a native user interface;
    generating a shortcut file including parameters received via the web browser-based user interface;
    initiating at the client machine, using the web application, the native user interface of the second system for sales order creation, using the shortcut file including the parameters received via the web browser-based user interface;
    causing the native user interface to be displayed simultaneously with the web browser-based user interface at the client machine;
    transferring at least a subset of information indicated in the web browser-based user interface to the native user interface of the second system for sales order creation;

launching at the client machine, in the native user interface of the second system, a native adapter sales order creation transaction based on the web-based transaction and causing the at least the subset of information transferred from the web browser-based user interface to be displayed in the native user interface of the second system for sales order creation;

based on receiving a user command via the native user interface, initiating, by the native adapter transaction using the native user interface, execution of the sales order creation function in the second system; and based on execution of the sales order creation function:

generating a sales order identifier in the second system; and returning, from the second system, response data including the sales order identifier via the native user interface to the web browser-based user interface.

2. The method of claim 1, wherein:

the initiating of the execution of the sales order creation function in the second system comprises issuing a remote function call from the native adapter transaction to the second system; and the returning of the response data comprises:

returning, from the second system, the response data to the native adapter transaction as a response to the remote function call; and returning, from the native adapter sales order creation transaction, the response data to the web browser-based user interface as a callback message.

3. The method of claim 1, the second system comprising a business object repository that includes the sales order creation function.

4. The method of claim 1, wherein the response data is returned via the native user interface to the web browser-based user interface in response to a polling request from the machine.

5. The method of claim 1, further comprising receiving, at the web application, parameters for execution of the native adapter transaction.

6. The method of claim 5, the parameters comprising at least one of an identifier for an object, an identifier for a function associated the object, and attributes for the function.

7. A non-transitory computer-readable storage medium including instructions that, when executed by at least one processor of a machine, cause the machine to perform operations comprising:

causing, at a client machine of a first system, a web browser-based user interface of the first system to be displayed;

launching at the client machine of the first system, in a web browser-based user interface of the first system, a web-based sales order creation transaction identifying a sales order creation function stored within a second system;

invoking, in the web-based transaction, a web application;

receiving, via the web browser-based user interface, user input for a web-based sales order;

receiving, via the web browser-based user interface, a user input command to launch a native user interface;

generating a shortcut file including parameters received via the web browser-based user interface;

initiating at the client machine, using the web application, the native user interface of the second system for sales order creation, using the shortcut file including the parameters received via the web browser-based user interface;

causing the native user interface to be displayed simultaneously with the web browser-based user interface at the client machine;

transferring at least a subset of information indicated in the web browser-based user interface to the native user interface of the second system for sales order creation;

launching at the client machine, in the native user interface of the second system, a native adapter sales order creation transaction based on the web-based transaction and causing the at least the subset of information transferred from the web browser-based user interface to be displayed in the native user interface of the second system for sales order creation;

based on receiving a user command via the native user interface, initiating, by the native adapter transaction using the native user interface, execution of the sales order creation function in the second system; and based on execution of the sales order creation function;

generating a sales order identifier in the second system; and returning, from the second system, response data including the sales order identifier via the native user interface to the web browser-based user interface.

8. The non-transitory computer-readable storage medium of claim 7, the web application executing within the first system.

9. The non-transitory computer-readable storage medium of claim 7, wherein:

the initiating of the execution of the function comprises issuing a remote function call from the native adapter transaction to the second system; and the returning of the response data comprises: returning, from the second system, the response data to the native adapter transaction as a response to the remote function call; and returning, from the native adapter transaction, the response data to the web browser-based user interface as a callback message.

10. The non-transitory computer-readable storage medium of claim 7, the second system comprising a business object repository that includes the sales order creation function.

11. The non-transitory computer-readable storage medium of claim 7, wherein the response data is returned via the native user interface to the web browser-based user interface in response to a polling request from the machine.

12. The non-transitory computer readable medium of claim 7, the operations further comprising:

receiving, at the web application, parameters based on user input provided via the web-based user interface, the parameters comprising at least one of an identifier for an object, and identifier for the function, and attributes for the function.

13. A system comprising:

at least one processor; and a memory comprising instructions that, when executed by the at least one processor, cause the system to perform operations comprising:

causing, at a client machine of a first system, a web browser-based user interface of the first system to be displayed;

launching at the client machine of the first system, in the web browser-based user interface of the first system, a web-based sales order creation transaction identifying a sales order creation function stored within a second system;

invoking, in the web-based transaction, a web application executing on one or more processors of the client machine;
receiving, via the web browser-based user interface, user input for a web-based sales order;
receiving, via the web browser-based user interface, a user input command to launch a native user interface;
generating a shortcut file including parameters received via the web browser-based user interface;
initiating at the client machine, using the web application, the native user interface of the second system for sales order creation, using the shortcut file including the parameters received via the web browser-based user interface;
causing the native user interface to be displayed simultaneously with the web browser-based user interface at the client machine;
transferring at least a subset of information indicated in the web browser-based user interface to the native user interface of the second system for sales order creation;
launching at the client machine, in the native user interface of the second system, a native adapter sales order creation transaction based on the web-based transaction and causing the at least the subset of information transferred from the web browser-based user interface to be displayed in the native user interface of the second system for sales order creation;
based on receiving a user command via the native user interface, initiating, by the native adapter transaction using the native user interface, execution of the sales order creation function in the second system; and based on execution of the sales order creation function;
generating a sales order identifier in the processing system; and
returning, from the processing system, response data comprising a sales order identifier via the native user interface session to the web-based user interface session.

14. The system of claim 13, the operations further comprising specifying multiple parameters for the native adapter transaction based on the user input.

15. The system of claim 13, the operations further comprising specifying, in the native adapter transaction, the sales order creation function provided in the second processing system based on data received in the web-based transaction.

16. The method of claim 1, wherein the shortcut file further includes a shortcut link to facilitate launching the native adapter sales order creation transaction.

17. The method of claim 1, wherein the generated sales order identifier is delivered from a native user interface session to a web browser-based user interface session to be displayed in the web browser-based user interface.

18. The method of claim 1, further comprising:
receiving user input including information for the sales order;
generating a sales order identifier associated with the sales order; and
causing the sales order identifier to be displayed at the client machine in the native user interface and the web browser-based user interface.

* * * * *